US010291490B1

(12) United States Patent
McAleer et al.

(10) Patent No.: US 10,291,490 B1
(45) Date of Patent: May 14, 2019

(54) SYSTEM AND METHOD FOR COLLECTING DATA FROM LOW-AVAILABILITY DEVICES

(71) Applicant: Dell Software Inc., Aliso Viejo, CA (US)

(72) Inventors: David McAleer, Toronto (CA); Kelly Noel Dyer, Toronto (CA)

(73) Assignee: Quest Software Inc., Aliso Viejo, CA (US)

(*) Notice: Subject to any disclaimer, the term of this patent is extended or adjusted under 35 U.S.C. 154(b) by 1113 days.

(21) Appl. No.: 14/178,165

(22) Filed: Feb. 11, 2014

(51) Int. Cl.
*G06F 15/173* (2006.01)
*H04L 12/26* (2006.01)

(52) U.S. Cl.
CPC .................................. *H04L 43/00* (2013.01)

(58) Field of Classification Search
None
See application file for complete search history.

(56) References Cited

U.S. PATENT DOCUMENTS

| 6,701,324 B1* | 3/2004 | Cochran | G06F 17/30545 |
| | | | 707/752 |
| 8,275,423 B2 | 9/2012 | Matson et al. | |
| 8,595,831 B2 | 11/2013 | Skare | |
| 2002/0161596 A1* | 10/2002 | Johnson | G06Q 10/10 |
| | | | 705/1.1 |
| 2003/0152059 A1* | 8/2003 | Odman | H04B 1/69 |
| | | | 370/338 |
| 2004/0205134 A1* | 10/2004 | Digate | G06Q 10/10 |
| | | | 709/206 |
| 2009/0016251 A1 | 1/2009 | Adams et al. | |
| 2009/0028053 A1* | 1/2009 | Kannan | G06F 11/079 |
| | | | 370/241 |
| 2010/0128645 A1 | 5/2010 | Lin et al. | |
| 2012/0218927 A1 | 8/2012 | Hsieh | |
| 2012/0221637 A1* | 8/2012 | Adachi | H04L 67/38 |
| | | | 709/204 |
| 2013/0262685 A1 | 10/2013 | Shelton et al. | |

FOREIGN PATENT DOCUMENTS

WO WO-2011019480 A2 2/2011

* cited by examiner

*Primary Examiner* — Umar Cheema
*Assistant Examiner* — Gregory P Tolchinsky
(74) *Attorney, Agent, or Firm* — Winstead PC

(57) ABSTRACT

In one embodiment, a method includes registering as a listener for availability notifications from at least one low-availability device. The method further includes determining a data-collection schedule of the at least one low-availability device. In addition, the method includes maintaining a prioritized queue comprising required data items needed from the at least one low-availability device. Also, the method includes preparing, in advance of the at least one low-availability device becoming available, a request for at least one required data item. The at least one required data item includes a highest-priority data item in the prioritized queue. The method additionally includes, responsive to a notification that the at least one low-availability device is available, transmitting the request to the at least one low-availability device.

19 Claims, 3 Drawing Sheets

SYSTEM AND METHOD FOR COLLECTING DATA FROM LOW-AVAILABILITY DEVICES

BACKGROUND

Technical Field

The present invention relates generally to data collection and more particularly, but not by way of limitation, to systems and methods for collecting data from low-availability devices.

History of Related Art

Many devices use a battery as their main source of power. Because time spent awake can contribute to battery drain, such devices often wake up, perform some tasks, and then go back to sleep in order to preserve battery power. A management challenge is presented since such devices may not be available on the network long enough for standard management. A similar challenge is posed by devices located in remote locations where internet protocol (IP) communication is required but broadband access is not cost effective. These devices often take advantage of existing cellular networks for IP communication by connecting to the cellular networks, sending data, and disconnecting from the cellular networks. An additional management challenge exists in trying to minimize cellular network costs.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method includes, on a computer system comprising at least one server computer, registering as a listener for availability notifications from at least one low-availability device. The method further includes determining a data-collection schedule of the at least one low-availability device. In addition, the method includes maintaining a prioritized queue comprising required data items needed from the at least one low-availability device. Also, the method includes preparing, in advance of the at least one low-availability device becoming available, a request for at least one required data item. The at least one required data item includes a highest-priority data item in the prioritized queue. The method additionally includes, responsive to a notification that the at least one low-availability device is available, transmitting the request to the at least one low-availability device.

In one embodiment, an information handling system includes a processing unit, wherein the processing unit is operable to implement a method. The method includes registering as a listener for availability notifications from at least one low-availability device. The method further includes determining a data-collection schedule of the at least one low-availability device. In addition, the method includes maintaining a prioritized queue comprising required data items needed from the at least one low-availability device. Also, the method includes preparing, in advance of the at least one low-availability device becoming available, a request for at least one required data item. The at least one required data item includes a highest-priority data item in the prioritized queue. The method additionally includes, responsive to a notification that the at least one low-availability device is available, transmitting the request to the at least one low-availability device.

In one embodiment, a computer-program product includes a non-transitory computer-usable medium having computer-readable program code embodied therein. The computer-readable program code is adapted to be executed to implement a method. The method includes registering as a listener for availability notifications from at least one low-availability device. The method further includes determining a data-collection schedule of the at least one low-availability device. In addition, the method includes maintaining a prioritized queue comprising required data items needed from the at least one low-availability device. Also, the method includes preparing, in advance of the at least one low-availability device becoming available, a request for at least one required data item. The at least one required data item includes a highest-priority data item in the prioritized queue. The method additionally includes, responsive to a notification that the at least one low-availability device is available, transmitting the request to the at least one low-availability device.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Figure 1:
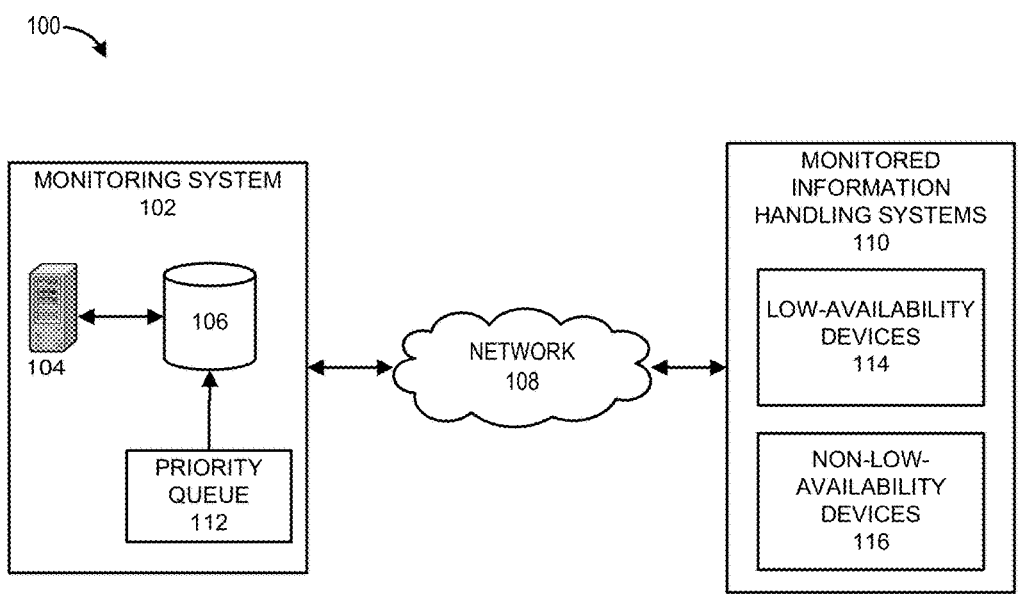
FIG. 1 illustrates a system for performing prioritized data collection.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

In various embodiments, data collection from low-availability devices can be improved via prioritized data collection as described herein. For purposes of this patent application, a low-availability device is an information handling system that is known to be periodically inaccessible, for example, for purposes of obtaining required data items. Information handling systems may be considered low-availability devices for various reasons. For example, some low-availability devices may be battery-powered devices that periodically enter a sleep mode in order to conserve battery power. By way of further example, other low-availability devices may be devices in remote locations that utilize cellular networks to exchange data. In these situations, such low-availability devices may only utilize the cellular networks at certain times or intervals in order to minimize cellular network costs. It should be appreciated that numerous other technical issues and/or other factors can result in particular information handling systems being considered low-availability devices.

For purposes of this patent application, a required data item refers to a unit of information that needs to be acquired from an information handling system such as, for example, a low-availability device. A required data item can be, for example, a status, a firmware version, a received signal strength indication (RSSI), a signal-to-noise ratio (SNR), and/or other information. In various embodiments, a particular required data item may be needed to generate a scheduled report, to service an on-demand request by a user, etc.

FIG. 1 illustrates a system 100 for performing prioritized data collection. The system 100 includes a monitoring system 102 communicating with a plurality of monitored information handling systems 110 over a communications network 108. In some embodiments, the monitoring system 102 monitors and controls the monitored information handling systems 110. For example, in various embodiments, the monitoring system 102 may encompass an industrial control system such as, for example, a supervisory control and data acquisition (SCADA) system or a distributed control system (DCS). In various other embodiments, the monitoring system 102 is merely representative of network node at which messages may be received. In these embodiments, the monitoring system 102 is not necessarily distinct from the monitored information handling systems 110.

It should be appreciated that the network 108 is intended to abstract a plurality of networks over which the monitoring system 102 may be operable to communicate. In particular, the network 108 logically represents all communication infrastructure for connecting the monitoring system 102 to each of the monitored information handling systems 110. The network 108 can include any number of wired and/or wireless communications networks such as, for example, public or private intranets, the Internet, public switched telephone networks (PSTNs), cellular networks, satellite communication, and the like. To the extent a particular information handling system of the monitored information handling systems 110 connects to the monitoring system 102 through others of the monitored information handling systems 110, for purposes of communication between the monitoring system 102 and the particular information handling system, the network 108 can be considered to include those other information handling systems.

The monitored information handling systems 110 can include, for example, field devices (e.g., programmable logic controllers (PLCs)) that control or monitor local operations such as opening and closing valves and breakers, sensor systems, remote terminal units (RTUs) that connect to and gather data from sensor systems, and the like. The monitored information handling systems 110 can also include, for example, server computers, desktop computers, laptop computers, tablet computers, and smartphones. The monitored information handling systems 110 can also include networking equipment such as, for example, routers, switches, wireless access points, and the like. In various embodiments, subsets of the monitored information handling systems 110 may be interconnected. Each interconnected subset may be arranged into a network topology that has, for example, a tree structure. In this manner, some of the monitored information handling systems 110 may be effectively dependent upon others of the monitored information handling systems 110. The monitored information handling systems 110 may also be geographically dispersed on a global level.

More particularly, as shown, the monitored information handling systems 110 can include low-availability devices 114 and non-low-availability devices 116. As described above, the low-availability devices 114 can be, for example, battery-powered devices that periodically enter a power-saving or sleep mode, remote devices that try to minimize utilization of a network such as, for example, a cellular network, and/or the like. The non-low-availability devices 116 generally include those of the monitored information handling systems 110 that are not included within the low-availability devices 114. The low-availability devices 114 can be identified during an initial discovery process that is initiated, for example, by listening for availability notifications and/or performing frequent Internet Protocol Message Protocol (IMCP) echo requests. When devices are discovered, services, capabilities, and device types can be determined. Therefore, such devices can be included in the monitored information handling systems 110 as one of the low-availability devices 114 or as one of the non-low-availability devices 116.

The monitoring system 102 includes at least one server computer 104 and a data store 106. The data store 106 can include, for example, one or more databases or flat files. The monitoring system 102 is operable to periodically issue commands to the monitored information handling systems 110 over the communications network 108. The commands may request required data items such as, for example, a status, a firmware version, a received signal strength indication (RSSI), a signal-to-noise ratio (SNR), and/or other information. The monitored information handling systems 110, in turn, are operable to transmit over the network 108 responses that include the required data items. Such responses are often transmitted asynchronously.

As noted above, the low-availability devices 114 may have sporadic availability over the network 108. The at least one server computer 104 is operable to maintain in the data store 106 a prioritized queue 112 that prioritizes how required data items are requested from the monitored information handling systems 110. In various embodiments, the prioritized queue 112 can be a sorted list of required data items such that each data item is associated with a priority value. In some embodiments, the priority values are scaled values between zero and one. In a typical embodiment, the prioritized queue 112 is sorted by the priority value.

In some cases, the prioritized queue 112 can be representative of a plurality of prioritized queues such that a separate prioritized queue is maintained for each of the monitored information handling systems 110. In other cases, the prioritized queue 112 can be a single queue that is utilized to manage data collection across all of the monitored information handling systems 110. Regardless of whether the prioritized queue 112 represents one prioritized queue or multiple separate prioritized queues, the prioritized queue 112 can typically be used to obtain a sorted list of required data items for particular ones of the monitored information handling systems 110.

In certain embodiments, request categories can serve as a basis for ascertaining the priority values. Request categories generally characterize a purpose for which the required data items were requested. The request categories can include, for example, scheduled reports, on-demand reports or requests from users, user dashboards, etc. As described in greater detail below, a request category for a given required data item can control how a corresponding priority value is calculated. The priority values of the prioritized queue 112 can be ascertained in various fashions.

For example, in some cases, the priority values can be Boolean values so that a given required data item is either prioritized or not prioritized (e.g., a priority value of one or zero). A priority rule could specify, for example, that all required data items of certain request categories (e.g., scheduled reports, on-demand requests, and user dashboards) are given a priority value of one (i.e., prioritized). All other required data items could be given a priority value of zero (i.e., not prioritized).

By way of further example, some or all of the priority values can be given an initial value (e.g., 0.5) that is adjusted upward or downward if certain criteria is met. The certain criteria could be based on the request categories of the required data items. For example, if a given required data item is responsive to an on-demand request from a user, a corresponding priority value could be adjusted upwards by a certain raw amount (e.g., +0.2), by a certain percentage (e.g., twenty percent), etc. Similarly, any of the required data items that relate to tasks deemed non-critical (e.g., logging for non-time-sensitive reports) could have corresponding priority values adjusted downwards by a certain raw amount or percentage (i.e., de-prioritization). The priority values can be normalized, for example, by identifying a highest priority value and dividing each of the priority values by the highest priority value.

In many cases, whether and/or how much the priority values are adjusted can be dependent on other factors such as a data-collection schedule. For example, if it is discovered from the data-collection schedule that there are seven more collection periods before a scheduled report is due, required data items that are needed for the scheduled report may have their priority values slightly increased in a rule-based manner (e.g., by 0.1). Conversely, if there is only one more collection period before the scheduled report is due, the increase may be increased by a much greater amount (e.g., by 0.5). In this manner, a sliding scale can be utilized so that the upwards adjustment becomes greater as the number of remaining collection periods decreases.

The priority values can also be set by rule responsive to certain criteria being met. As described above, the certain criteria can be based on the request categories. Continuing the above example, if it is discovered from the data-collection schedule that there is only one more collection period before a scheduled report is due, each required data item needed for the scheduled report could have its priority value set to a maximum value such as, for example, one. Further examples will be described with respect to FIGS. 2-3.

Figure 2:
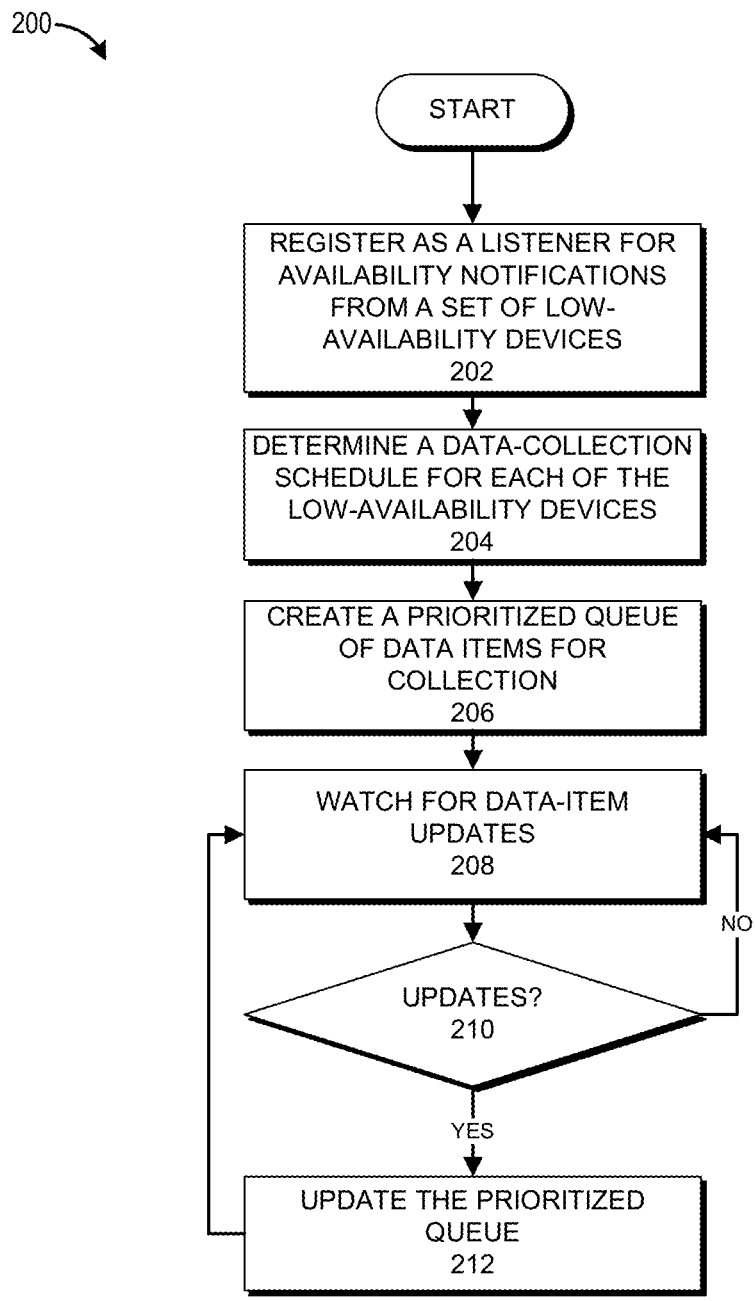
FIG. 2 illustrates a process for maintaining a prioritized queue.

FIG. 2 presents a flowchart of an example of a process 200 for maintaining the prioritized queue 112. The process 200 can be implemented by any system that can access one or more data sources. For example, the process 200, in whole or in part, can be implemented by one or more of the at least one server computer 104, the data store 106, and any of the monitored information handling systems 110. The process 200 can also be performed generally by the monitoring system 102. Although any number of systems, in whole or in part, can implement the process 200, to simplify discussion, the process 200 will be described in relation to specific systems or subsystems of the system 100.

At block 202, the monitoring system 102 registers as a listener for availability notifications from the low-availability devices 114. Registration can be accomplished in various manners. For example, in some cases, the registration can occur during provisioning at installation time. The registration can also occur via registration in a centralized lookup service. In still other cases, the registration can involve the monitoring system 102 sending, for example, Internet Protocol Message Protocol (IMCP) echo requests at a higher than normal rate so that the availability of the low-availability devices 114 can be more quickly and readily detected.

At block 204, the monitoring system 102 determines a data-collection schedule for each of the low-availability devices 114. In a typical embodiment, the block 204 includes tracking a frequency at which each of the low-availability devices 114 becomes available to the monitoring system 102 over the network 108. The block 204 can further include tracking a duration of such availability. For each of the low-availability devices 114, the determined data-collection schedule can include, for example, a mean or median interval at which each of the low-availability devices 114 becomes available (e.g., every m minutes). The determined data-collection schedule can also include, for example, an average or median duration of availability (e.g., n minutes) for each of the low-availability devices 114.

By tracking the frequency of availability, in various embodiments, the monitoring system 102 is operable to recognize when the low-availability devices 114 are not in a low-availability state as they should be. In the low-availability state, the low-availability devices 114 typically have regular periods of unavailability. The regular periods of unavailability generally correspond, for example, to when the low-availability devices 114 are in sleep mode, power-saving mode, offline mode, etc. Therefore, in various embodiments, the monitoring system 102 can infer that a given low-availability device is not in the low-availability state by detecting a near continuous pattern of availability. This can result, for example, in battery power, money, and other resources being wasted. Therefore, in some cases, the monitoring system 102 can take corrective action. For example, the monitoring system 102 can issue a notification to an administrator so that the administrator can force the given low-availability device into the low-availability state. By way of further example, the monitoring system 102 can issue a command to the given low-availability device that forces it into the low-availability state.

At block 206, the monitoring system 102 creates the prioritized queue 112. As noted above, the prioritized queue 112 typically lists required data items that are to be collected from one or more of the monitored information handling systems 110. The block 206 can include, for example, ascertaining a priority value for each of the required data items and merging any entries deemed identical (e.g., entries that request a same required data item from a same monitored information handling system). In cases in which the prioritized queue 112 has already been created, the block 206 can encompass functionality to add and/or update entries in the prioritized queue 112.

In a typical embodiment, the priority values are raw or normalized values, the exact values of which depend on an importance of a corresponding required data item. In some embodiments, the monitoring system 102 applies a rule or series of rules such that each rule adjusts or sets the priority value as described above. In the case of identical entries, in some embodiments, the monitoring system 102 identifies a highest priority value from among the identical entries and uses that value as the priority value for the merged entry. In other embodiments, the merged entry can be given a priority value that is even higher than the highest priority value, for example, as a result of the same required data item having been requested multiple times.

At block 208, the monitoring system 102 watches for data-item updates. The data-item updates can result, for example, from new requests that specify additional required data items. At decision block 210, the monitoring system 102 determines whether there are any data-item updates, If not, the process 200 returns to the block 208 and continues to watch for data-item updates as described above. If it is determined at the decision block 208 that there are data-item updates, the process 200 proceeds to block 212.

At the block 212, the monitoring system 102 updates the prioritized queue 112. In various embodiments, the block 212 can encompass performing functionality similar to that described above with respect to blocks 204 and 206. In some embodiments, at the block 212, the monitoring system 102 computes a priority value for each entry of the prioritized queue 112. In other embodiments, at the block 212, the monitoring system 102 may only compute a priority value for new entries of the prioritized queue 112 (e.g., the additional required data items mentioned above) while all other entries of the prioritized queue 112 retain a previously computed priority value.

Figure 3:
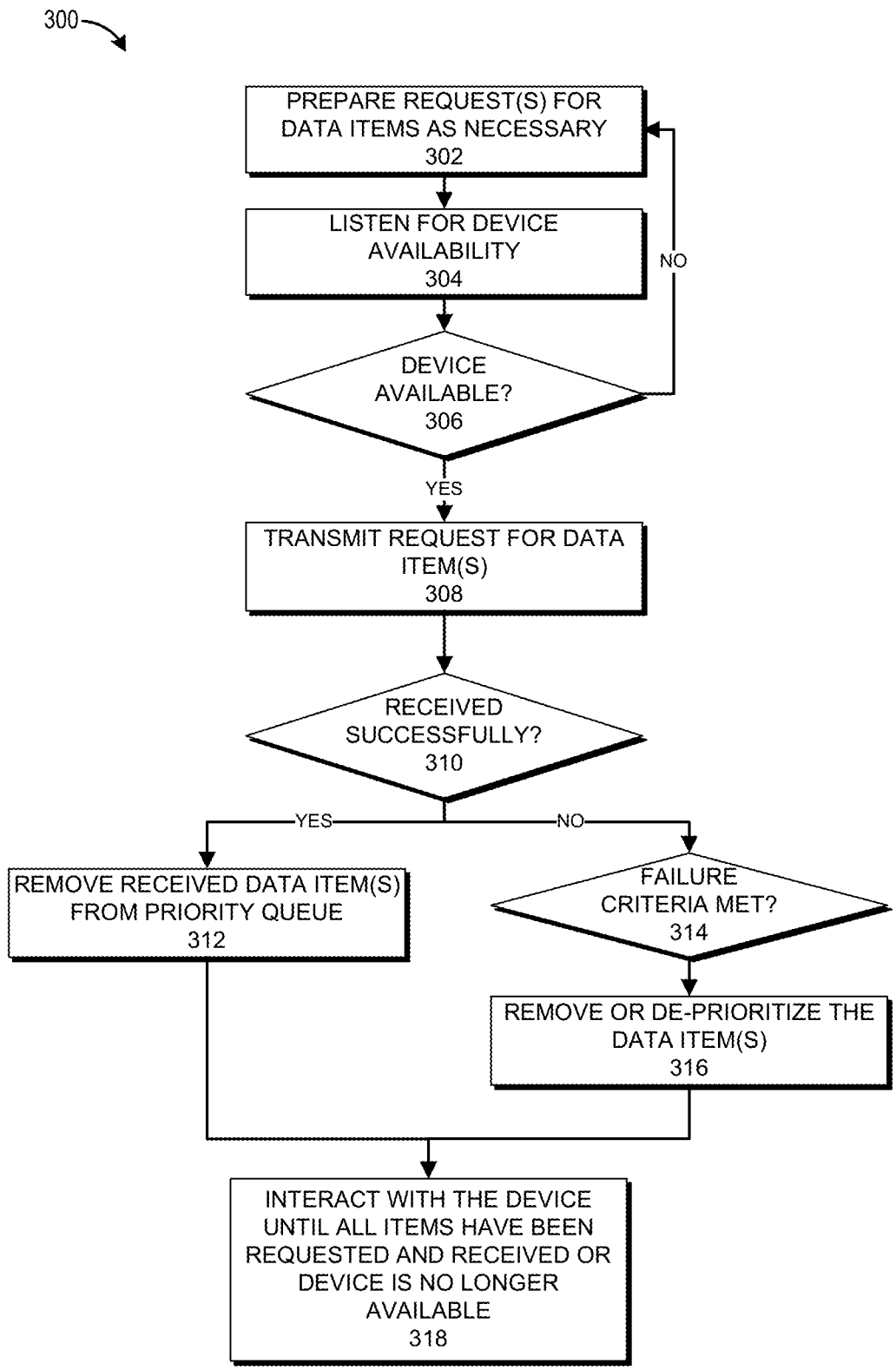
FIG. 3 illustrates a process for performing prioritized data collection.

FIG. 3 presents a flowchart of an example of a process 300 for performing prioritized data collection. The process 300 can be implemented by any system that can access one or more data sources. For example, the process 300, in whole or in part, can be implemented by one or more of the at least one server computer 104, the data store 106, and any of the monitored information handling systems 110. The process 300 can also be performed generally by the monitoring system 102. Although any number of systems, in whole or in part, can implement the process 300, to simplify discussion, the process 300 will be described in relation to specific systems or subsystems of the system 100.

In a typical embodiment, the process 300 can be performed subsequent to the process 200 of FIG. 2. For purposes of illustration, the process 300 will be described as being performed with respect to a low-availability device selected from the low-availability devices 114. It should be appreciated that the process 300 can be performed, for example, for each low-availability device of the low-availability devices 114. In other embodiments, the process can be performed, for example, for each of the monitored information handling systems 110 so that both the low-availability devices 114 and the non-low-availability devices 116 are included.

At block 302, the monitoring system 102 prepares, in advance of the low-availability device becoming available over the network 108, one or more requests for required data items. In some cases, the monitoring system 102 can prepare requests for all required data items in the prioritized queue 112 that are needed from the low-availability device. In other cases, the monitoring system 102 can only prepare requests for those required data items that are deemed high priority, for example, by having a priority value greater than a threshold value (e.g., 0.7 on a scale of zero to one). In some embodiments, the block 302 can be performed as a distinct process that continually prepares more requests as requests are transmitted by the monitoring system (described below with respect to blocks 308 and 318). In these embodiments, for purposes of continually preparing requests, the monitoring system 102 can iterate from highest priority data items to lowest priority data items.

In general, the block 302 can entail preparing, for example, request packets, buffers, and transport packets so that each is ready when the low-availability device becomes available. If supported by the low-availability device, bulk requests can be prepared in order to minimize both collection time and an overall amount of data that is transmitted. Each iteration of the block 302 can result in additional preparation in this fashion as the prioritized queue 112 is populated with additional required data items. The block 302 is performed as necessary. If it is not necessary to prepare any requests because, for example, such requests have been previously prepared, the process 300 can proceed directly to block 304.

At the block 304, the monitoring system 102 listens for the low-availability device's availability. Availability can be detected according to how the monitoring system 102 registered as listener at the block 202 of FIG. 2. For example, the monitoring system 102 can receive an availability notification when the low-availability device is detected as being available over the network 108. At decision block 306, the monitoring system 102 determines whether the low-availability device is available. If not, the process 300 returns to the block 302 and proceeds as described above. If it is determined at the decision block 306 that the low-availability device is available, the process 300 proceeds to block 308.

At the block 308, the monitoring system 102 transmits to the low-availability device at least one request, for example, that was prepared at the block 302. The at least one request can be a request corresponding to a highest-priority required data item that has not yet been received from the low-availability device. In some cases, the at least one request can also be a bulk request as described above. In cases in which bulk requests are not utilized, the monitoring system 102 can send, for example, one request at a time, iterating from highest priority to lowest priority.

At decision block 310, the monitoring system 102 determines whether a response to the at least one request has been successfully received. In general, successful receipt means that a valid response has been received within a certain period of time. If it is determined at the decision block 310 that a response to the at least one request has been successfully received, the process 300 proceeds to block 312. At block 312, the monitoring system 102 removes from the prioritized queue 112 each required data item that was received in the response. From block 312, the process 300 proceeds to block 318. If it is determined at the decision block 310 that no response to the at least one request has been successfully received, the process 300 proceeds to block 314.

At block 314, the monitoring system 102 determines whether failure criteria has been met. In a typical embodiment, the failure criteria specify one or more conditions such as, for example, a minimum number of sequential failures (e.g., three). In a typical embodiment, if the failure criteria is met, that could mean that whatever required data item(s) is being requested is effectively blocking the prioritized queue 112. Under these circumstances, such required data item(s) can either be removed from the prioritized queue 112 or have their priority values adjusted downward. If it is determined at the block 314 that the failure criteria is met, the process 300 proceeds to block 316. At the block 316, the monitoring system can either remove the required data item(s) from the queue or de-prioritize the required data item(s), for example, by adjusting their priority values. From block 316, the process 300 proceeds to block 318.

At block 318, the monitoring system 102 interacts with the low-availability device until either all required data items have been received or removed from the prioritized queue 112 or the low-availability becomes unavailable (e.g., by entering a power-saving or sleep mode or ceasing to use a paid network such as a cellular network). As noted above, the monitoring system 102 can send, for example, one request at a time, iterating from highest priority to lowest priority. Thus, the block 318 can encompass iteratively performing the functionality described above with respect to blocks 308-316 for each required data item that is needed from the low-availability device. The process 300 can terminate at any point if, for example, there are no required data items in the prioritized queue 112 for the low-availability device. In such cases, the process 300 can re-commence upon the appearance of new required data items in the prioritized queue 112 that are needed from the low-availability device.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising, on a computer system comprising at least one server computer:
    registering as a listener for availability notifications from at least one low-availability device;
    determining a data-collection schedule of the at least one low-availability device based at least in part on the availability notifications, the determining comprising tracking a frequency of availability and a duration of availability of the at least one low-availability device over time, the data-collection schedule comprising a determined frequency and a determined duration;
    maintaining a prioritized queue comprising required data items needed from the at least one low-availability device, wherein the required data items are prioritized in the prioritized queue based at least in part on the data-collection schedule and a time when one or more of the required data items are needed;
    preparing, in advance of the at least one low-availability device becoming available, a request for at least one required data item, the at least one required data item comprising a highest-priority data item in the prioritized queue; and
    responsive to a notification that the at least one low-availability device is available, transmitting the request to the at least one low-availability device.

2. The method of claim 1, wherein the maintaining comprises creating the prioritized queue.

3. The method of claim 1, wherein the maintaining comprises updating the prioritized queue responsive to data-item updates.

4. The method of claim 1, comprising, responsive to successful receipt of the at least one required data item, removing the at least one required data item from the prioritized queue.

5. The method of claim 1, comprising, responsive to no successful receipt of the at least one required data item:
    determining whether at least one failure criterion has been met; and
    responsive to a determination that the at least one failure criterion has been met, performing at least one of the following:
        removing the at least one required data item from the prioritized queue; and
        de-prioritizing the at least one required data item.

6. The method of claim 1, comprising interacting with the at least one low-availability device until at least one of the following is true:
    the prioritized queue contains no required data items that are needed from the at least one low-availability device; and
    the at least one low-availability device is no longer available.

7. The method of claim 1, wherein the required data items comprise at least one selected from the group consisting of: a firmware version, a received signal strength indication (RSSI), and a signal-to-noise ratio (SNR).

8. The method of claim 1, wherein:
    each required data item in the prioritized queue is associated with a priority value;
    the prioritized queue comprises a list of the required data items sorted by the priority value; and
    the maintaining comprises ascertaining each priority value.

9. The method of claim 8, wherein the ascertaining is based, at least in part, on a request category of each of the required data items.

10. The method of claim 9, wherein, for at least one required data item in the prioritized queue, the ascertaining is based, at least in part, on a number of collection periods remaining before a scheduled report is due.

11. The method of claim 9, wherein, for at least one required data item in the prioritized queue, the ascertaining comprises adjusting an initial priority value based, at least in part, on the request category of the at least one required data item.

12. The method of claim 9, wherein, for at least one required data item in the prioritized queue, the ascertaining comprises setting the priority value based, at least in part, on the request category of the at least one required data item.

13. The method of claim 9, wherein the request category is selected from the group consisting of: scheduled reports, on-demand requests from users, and user dashboards.

14. The method of claim 1, wherein the maintaining comprises merging identical entries in the prioritized queue.

15. The method of claim 1, wherein the determining comprises:

detecting that the at least one low-availability device is not in a low-availability state; and taking corrective action based thereon.

16. The method of claim 1, wherein:

the at least one low-availability device comprises a plurality of low-availability devices; and the method is performed for each low-availability device of the plurality of low-availability devices.

17. The method of claim 1, comprising receiving a response to the request, the response comprising the at least one required data item.

18. An information handling system comprising:

a computer processor, wherein the computer processor is operable to implement a method comprising:

registering as a listener for availability notifications from at least one low-availability device;

determining a data-collection schedule of the at least one low-availability device based at least in part on the availability notifications, the determining comprising tracking a frequency of availability and a duration of availability of the at least one low-availability device over time, the data-collection schedule comprising a determined frequency and a determined duration;

maintaining a prioritized queue comprising required data items needed from the at least one low-availability device, wherein the required data items are prioritized in the prioritized queue based at least in part on the data-collection schedule and a time when one or more of the required data items are needed;

preparing, in advance of the at least one low-availability device becoming available, a request for at least one required data item, the at least one required data item comprising a highest-priority data item in the prioritized queue; and responsive to a notification that the at least one low-availability device is available, transmitting the request to the at least one low-availability device.

19. A computer-program product comprising a non-transitory computer-usable medium having computer-readable program code embodied therein, the computer-readable program code adapted to be executed to implement a method comprising:

registering as a listener for availability notifications from at least one low-availability device;

determining a data-collection schedule of the at least one low-availability device based at least in part on the availability notifications, the determining comprising tracking a frequency of availability and a duration of availability of the at least one low-availability device over time, the data-collection schedule comprising a determined frequency and a determined duration;

maintaining a prioritized queue comprising required data items needed from the at least one low-availability device, wherein the required data items are prioritized in the prioritized queue based at least in part on the data-collection schedule and a time when one or more of the required data items are needed;

preparing, in advance of the at least one low-availability device becoming available, a request for at least one required data item, the at least one required data item comprising a highest-priority data item in the prioritized queue; and responsive to a notification that the at least one low-availability device is available, transmitting the request to the at least one low-availability device.

* * * * *